(No Model.)  2 Sheets—Sheet 1.

L. M. DEVORE.
DEVICE FOR REPAIRING PNEUMATIC TIRES.

No. 570,155.  Patented Oct. 27, 1896.

Witnesses:
Oliver B. Plumtree
A. H. Ebbesen

Inventor:
Levi M. Devore
by Wiles Garner & Bitner
attys

THE NORRIS PETERS CO., PHOTO-LITHO., WASHINGTON, D. C.

(No Model.) 2 Sheets—Sheet 2.
L. M. DEVORE.
DEVICE FOR REPAIRING PNEUMATIC TIRES.
No. 570,155. Patented Oct. 27, 1896.
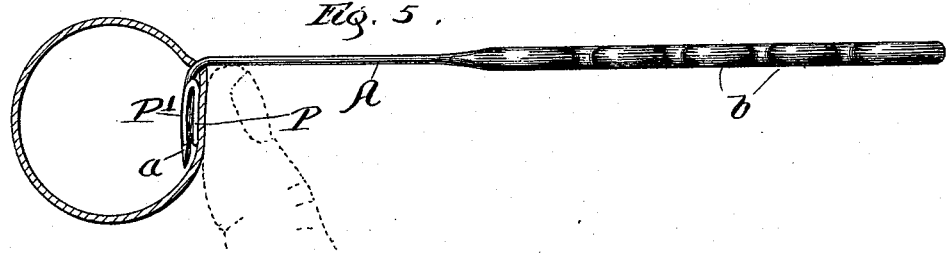
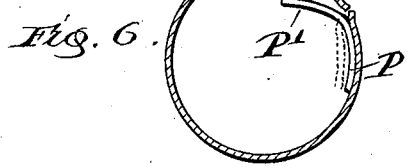
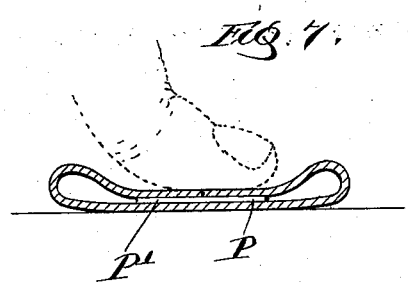
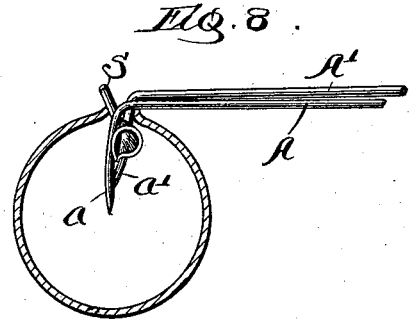
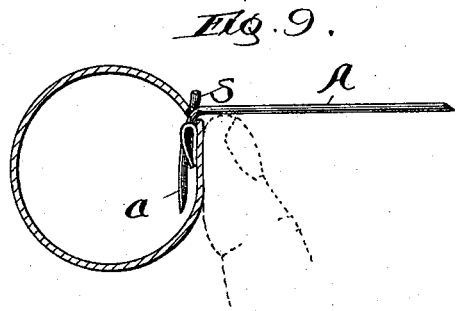
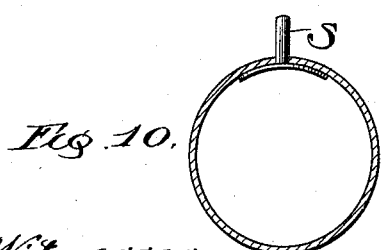
Witnesses:
Inventor:

UNITED STATES PATENT OFFICE.

LEVI M. DEVORE, OF FREEPORT, ILLINOIS.

DEVICE FOR REPAIRING PNEUMATIC TIRES.

SPECIFICATION forming part of Letters Patent No. 570,155, dated October 27, 1896.

Application filed September 3, 1895. Serial No. 561,179. (No model.)

*To all whom it may concern:*

Be it known that I, LEVI M. DEVORE, a citizen of the United States of America, residing at Freeport, in the county of Stephenson and State of Illinois, have invented certain new and useful Improvements in Devices for Repairing Pneumatic Tires, of which the following is a specification.

My invention relates to improvements in devices for repairing pneumatic tires, and is fully described and explained in this specification and shown in the accompanying drawings, in which—

Figure 1:
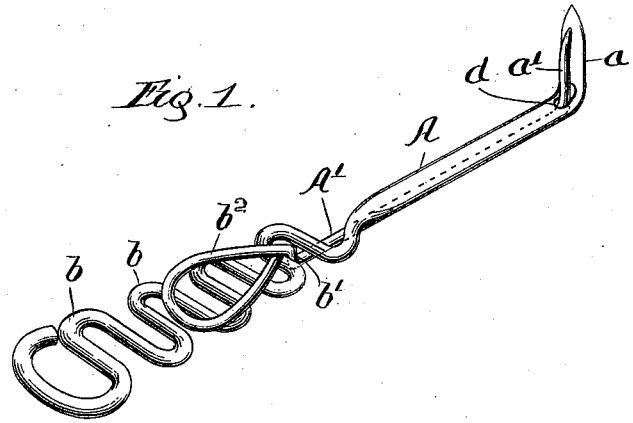
Figure 2:
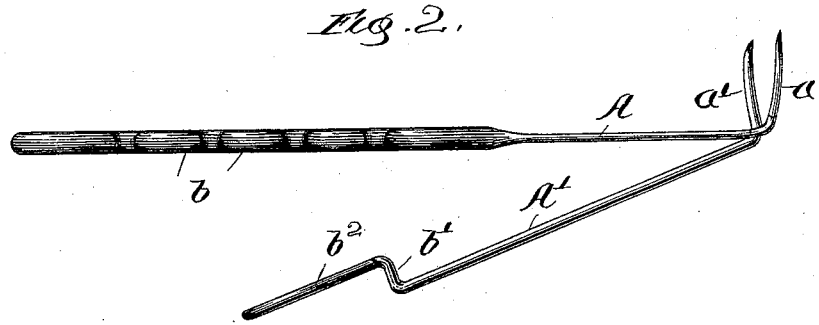
Figure 3:
Figure 4:
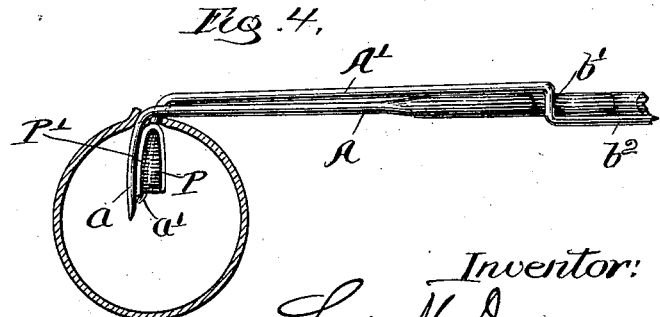

Figure 1 is a perspective view of my device, its two parts being locked in their operative relation. Fig. 2 is a side elevation of the parts, their coacting jaws being separated to receive a rubber patch. Fig. 3 is a side elevation of the device with the jaws fastened in operative relation, a patch being held between them. Fig. 4 is a side elevation of the device with the patch held between the jaws, the whole being in operative relation to a rubber tire-tube, the patch being held between the jaws and within the tube and the tube being shown in cross-section. Fig. 5 is a view similar to Fig. 4, except that one of the parts of the device has been separated from the other. Fig. 6 is a cross-section of the tire-tube, showing the patch alone in the position it assumes after the complete removal of the device. Fig. 7 is a cross-section of the tube, showing its walls pressed together to cause complete adhesion of the patch. Fig. 8 is a side elevation of the end portions of the device, including the jaws, a patch like that shown in Fig. 11 being held between the jaws. Fig. 9 is a view similar to Fig. 5, showing the modified patch in its application to the tube. Fig. 10 is a cross-section of the tube with the patch completely attached, and Fig. 11 is a perspective view of the patch.

The device illustrated in the drawings is made up of two parts having approximately straight shanks A A', and points $a\ a'$, approximately at right angles to the shanks. The shank A is preferably broader than the shank A' and flattened, as shown, and at its angle with the point $a$ it is formed with a hole $d$, through which the point $a'$ may be passed, as shown in Fig. 2, after which the two shanks may be brought into close contact, bringing the points $a\ a'$ together, as shown in Fig. 1. The handles of the two shanks may be formed in any suitable manner, but preferably should be of such shape as to engage each other and lock together when the shanks are in contact. The form in which I have made the handles and the one which I prefer is that shown in the drawings, in which the shank A is provided with a series of transverse bends $b\ b$, forming the handle, and the shank A' is formed with an offset $b'$ and a terminal loop $b^2$, parallel to the shank, the offset bend $b'$ being adapted to enter one of the reëntrant angles between the transverse bends $b\ b$ and thus lock the shanks together, as clearly shown in Figs. 1 and 3.

The operation of the device thus described in repairing a punctured tube is clearly illustrated in the drawings and is as follows: A flat patch of suitable sheet-rubber is doubled upon itself to form two folds P P' and is clasped between the points $a\ a'$, as shown in Fig. 3. A suitable amount of rubber cement having been applied to the inner surface of the tire, adjacent to the puncture, by means of the ordinary cement-tube, the points $a\ a'$, together with the patch, are thrust through the puncture and into the position shown in Fig. 4, the inward motion of the point of the tool being limited by the position of the points with reference to the shanks, which is such that when the points have been thrust into the position indicated in Fig. 4 the shanks strike the outer face of the tire-tube and arrest the movement of the points, thus preventing the latter from striking and cutting the opposite wall of the tube. The points and patch being thus introduced the handles are swung about the hole in the tube as a pivot until the inner face of the tube, immediately about the hole, is thoroughly coated with cement. The handle $b^2$ is then unlocked from the handle $b\ b$, and the shank A' and point $a'$ are withdrawn entirely, leaving the shank A, point $a$, and the patch in the position shown in Fig. 5, the surface of the fold P being in contact with the inner face of the tube. This surface is then firmly united to the inner face of the tube by suitable pressure, as indicated in Fig. 5, and the shank A and point $a$ are removed, leaving the patch in the position shown in Fig. 6, the fold P being cemented to the inner face of the tube and the fold P' being loose, but brought into a position contiguous to the face of the tube by the elasticity of the patch. The tube is then compressed, as shown in Fig. 7, when the part P' of the patch adheres to the inner surface of the tube. Throughout this operation one face of the patch (namely, the one forming the inner surface of the two folds P P') is free from cement, and it therefore has no tendency to adhere to the opposite wall of the tube.

Figs. 8, 9, 10, and 11 illustrate the use of the device with a patch formed with a stem, which is a well-known form in the art of mending bicycle-tires. In the use of this form the patch is folded as shown in Fig. 8, the stem S of the patch being passed outward through the opening at the bend of the shank A. The patch is inserted in the same way as has already been described, the stem being of such length as to project through the hole in the tube which admits the points and the patch itself. Before the withdrawal of the part A' a' the cement on the patch is applied to the inner surface of the tube in the manner already described, whereupon the part A' a' is withdrawn, leaving the parts in the position shown in Fig. 9. After the adhesion of one part of the patch is effected the part A a of the tool is withdrawn, and the patch may be drawn into close contact with the tube by means of the stem S, which may be cut off close to the outer surface of the tube when the adhesion of the entire patch is perfected.

The tool thus described is extremely simple and easily constructed, and in operation it meets every requirement of the purpose for which it is designed. I have found in actual practice that punctures of any character may be readily and perfectly repaired in the manner described in the specification, and the whole operation of repairing a puncture with this tool consumes so little time that the making of repairs to the tube is no longer a matter of consequence.

Having now described and explained my invention, what I claim as new, and desire to secure by Letters Patent, is—

1. A tool for repairing bicycle-tires, comprising two shanks, each having a point approximately at right angles to it, the shanks being adapted to be separably connected and thereby to bring the points into position to clasp between them a folded patch, the points when in such relation being adapted to be thrust through the wall of a bicycle-tire tool carrying with them the folded patch, and the angle between the points and shanks being adapted to limit the inward movement of the points.

2. A tool for repairing bicycle-tires comprising two shanks adapted to be separably connected and having points approximately at right angles to them and handles adapted to be interlocked when the shanks are brought into suitable relation, the points being adapted to clasp a folded patch between them, when the shanks are in their locked relation.

3. A tool for repairing bicycle-tires comprising two shanks having points approximately at right angles to them, one of said shanks being formed with an opening approximately at its angle, through which the point of the other shank may be passed, the points when in operative relation being adapted to clasp between them a folded patch and to carry the same through the wall of a bicycle-tire tube.

4. The combination with the shank, A, having the point, $a$, and opening, $d$, of the shank, A', having the point, $a'$, adapted to be passed through the hole, $d$, the shanks being formed with handles adapted to interlock when the points, $a$, $a'$, are brought together.

5. The combination with the shank, A, having the point, $a$, approximately at right angles to it and the opening, $d$, of the shank, A', having the point, $a'$, approximately at right angles to it and adapted to pass through the opening, $d$, the shank, A, being formed with a handle having a reëntrant angle, and the shank, A', being formed with an offset, $b$, and handle, $b^2$, the offset, $b'$, being adapted to enter the reëntrant angle in the handle of the shank, A, and thereby to lock the two shanks together.

6. The combination with the shank, A, having the point, $a$, and opening, $d$, of the shank, A', having the point, $a'$, the shank, A, being formed with a handle made up of transverse bends, $b$, $b$, and the shank, A', being formed with the offset, $b'$, and handle, $b^2$.

LEVI M. DEVORE.

Witnesses:
R. H. WILES,
LOUIS DICKES.